United States Patent
Choi

(10) Patent No.: US 8,864,978 B2
(45) Date of Patent: Oct. 21, 2014

(54) SUPERCRITICAL WATER PROCESS TO UPGRADE PETROLEUM

(71) Applicant: Ki-Hyouk Choi, Dhahran (SA)

(72) Inventor: Ki-Hyouk Choi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 173 days.

(21) Appl. No.: 13/665,599

(22) Filed: Oct. 31, 2012

(65) Prior Publication Data

US 2013/0140214 A1  Jun. 6, 2013

Related U.S. Application Data

(60) Provisional application No. 61/553,758, filed on Oct. 31, 2011.

(51) Int. Cl.

| | | |
|---|---|---|
| *C10G 9/00* | (2006.01) | |
| *C10G 31/08* | (2006.01) | |
| *C10G 31/06* | (2006.01) | |
| *C10G 21/06* | (2006.01) | |
| *B01J 3/00* | (2006.01) | |
| *C10G 55/00* | (2006.01) | |

(52) U.S. Cl.
CPC *C10G 55/00* (2013.01); *B01J 3/008* (2013.01)
USPC ........... 208/106; 208/102; 208/107; 208/319; 585/310

(58) Field of Classification Search
CPC ........... B01J 3/008; C10G 9/00; C10G 31/08; C10G 47/32; C10G 55/00
USPC ........... 208/102, 106, 107, 125, 128; 585/310
See application file for complete search history.

(56) References Cited

U.S. PATENT DOCUMENTS

| | | |
|---|---|---|
| 4,483,761 A | 11/1984 | Paspek |
| 4,557,820 A | 12/1985 | Paspek |
| 4,559,127 A | 12/1985 | Paspek |
| 4,594,141 A | 6/1986 | Paspek |
| 7,591,983 B2 | 9/2009 | Takahashi et al. |
| 7,740,065 B2 | 6/2010 | Choi |
| 7,754,067 B2 | 7/2010 | Allam |
| 7,922,895 B2 | 4/2011 | Banerjee |
| 2009/0145805 A1 | 6/2009 | Choi |
| 2009/0159504 A1 | 6/2009 | Choi |
| 2009/0166262 A1 | 7/2009 | He et al. |
| 2009/0173664 A1 | 7/2009 | Choi |
| 2009/0178952 A1 | 7/2009 | Choi |

FOREIGN PATENT DOCUMENTS

WO  2009/073446 A2  6/2009

OTHER PUBLICATIONS

Hitachi, Characteristics of Vanadium Removal and Coke Formation Using Supercritical Water for Heavy Oil Upgrading, Journal of the Japan Petroleum Institute, 2011, pp. 96-102, vol. 54.

(Continued)

*Primary Examiner* — Walter D Griffin
*Assistant Examiner* — Derek Mueller
(74) *Attorney, Agent, or Firm* — Bracewell & Giuliani LLP; Constance G. Rhebergen; James M. Sellers

(57) ABSTRACT

Provided is a process for the supercritical upgrading of petroleum feedstock, wherein the process includes the use of a start-up agent, wherein the use of the start-up agent facilitates mixing of the petroleum feedstock and water, thereby reducing or eliminating the production of coke, coke precursor, and sludge.

16 Claims, 4 Drawing Sheets

(56) References Cited

OTHER PUBLICATIONS

Chiyoda Co. And Fuji Oil Co., The Advanced EUREKA process: Environment Friendly Thermal Cracking Process, Proceeding of 19th World Petroleum Congress, Spain 2008.

PCT Notification of Transmittal of the International Search Report and the Written Opinion of the International Searching Authority, or the Declaration; dated Feb. 28, 2013; International Application No. PCT/US2012/062548; International File Date: Oct. 30, 2012.

Hossain, M., Kitaguch, T., Sato, Y., Tago, T. and Masuda, T.; Heavy Oil Upgrading in Supercritical Water Using Iron Based Catalyst; XP-002691794; 20th Saudi Arabia Japan Joint Symposium; Dec. 5-6, 2010.

SUPERCRITICAL WATER PROCESS TO UPGRADE PETROLEUM

RELATED APPLICATIONS

This application claims priority to U.S. Provisional Patent Application Ser. No. 61/553,758, filed on Oct. 31, 2011, the disclosure of which is incorporated by reference in its entirety.

FIELD OF THE INVENTION

This invention relates to process for the upgrading of petroleum. More specifically, the invention relates to a process for the supercritical upgrading of petroleum to provide a desulfurized, upgraded hydrocarbon stream.

BACKGROUND OF THE INVENTION

Petroleum has become an essential part of our daily lives as it is important as a source of both energy and chemicals. There are, however, many problems associated with the recovery and processing of petroleum, such as the huge environmental impact associated therewith. In order to reduce the impact on environment, stringent policies and restrictions have been implemented by many countries on petroleum products. For example, in many countries, including the United States, strict regulations have been implemented relating to the amounts and types of sulfur compounds that can be included in motor gasoline and diesels.

These ever increasing demands for and stricter regulations on petroleum products poise inevitable challenge for the petroleum industry. Furthermore, the increasing supply of inferior petroleum sources, such as heavy and sour crude oils, requires major breakthroughs in refining technology to supply larger quantities of higher quality petroleum products to market. The recovery of petroleum from lower quality sources means that the petroleum that is recovered will likely include increased amounts of impurities, such as sulfur and metals, and greater percentages of heavy oil fractions. This in turn requires increased processing procedures designed to remove impurities and to convert the heavy fractions to more desirable and usable lighter fractions. Generally, the petroleum refining industry has relied upon conventional methods to clean and upgrade these lower quality petroleum feedstocks.

In general, conventional methods for cleaning and upgrading petroleum feedstock can be classified into two groups: hydrogenative and thermal methods. Hydrogenative methods, which can include hydrotreating and hydrocracking, typically employ hydrogen gas and a catalyst to remove impurities and convert the heavier fractions into light and middle-range petroleum products. Thermal methods, which can include coking and visbreaking typically do not utilize either hydrogen gas or a catalyst, instead relying upon relatively high temperatures for the conversion of heavier fractions. These conventional technologies have been proven and operated for long time.

Conventional methods, however, suffer from many limitations and drawbacks. For example, hydrogenative methods typically require large amount of hydrogen gas to achieve the desired level of upgrading and desulfurization conversion. Additionally, hydrogenative methods also require large amounts of catalyst, due to the frequent deactivation of catalyst. Thermal methods suffer from the production of large amount of coke as a byproduct and generally demonstrate limited success in the removal of impurities, such as sulfur and nitrogen, and can result in the production of large amounts of olefin and diolefin products, which must then be stabilized.

Thus, there exists a need to develop new methods for the upgrading of certain petroleum products that address and reduce the limitations and drawbacks noted above.

SUMMARY

Generally, methods are provided for the supercritical water mediated upgrading of petroleum feedstocks, particularly petroleum feedstocks that include sulfur. The methods described herein utilize a start-up agent, which is effective for preventing the formation of coke, coke precursors, and sludge, and which allows the process to proceed more effectively than when the start-up agent is not employed.

In one aspect, a method for upgrading a petroleum feedstock with supercritical water is provided that prevents plugging in process equipment lines. The method includes the steps of priming an upgrading reactor to receive the petroleum feedstock. The priming of the apparatus includes the steps of supplying a heated and pressured water stream to a first mixing device, wherein the water stream is heated and pressurized to a temperature and pressure greater than the critical point of water. The priming step then includes the step of supplying a heated and pressurized start-up agent stream to the first mixing device, wherein the start-up agent stream is heated and pressurized to a temperature of between about 10 and 250° C. and mixing the heated and pressurized water stream and the heated and pressurized start-up agent stream in the first mixing device to produce a water and start-up hydrocarbon containing primer stream. The water and start-up agent containing primer stream are supplied to the upgrading reactor, said reactor being maintained at a temperature that is between about 380 and 550° C. to produce a treated primer stream, wherein the primer stream has a residence time in the upgrading reactor of between about 10 seconds and 60 minutes. The treated primer stream is cooled to a temperature of less than about 150° C. and depressurized. The cooled treated primer stream is then separated into treated primer gas and treated primer liquid phase streams, and the treated primer liquid phase is separated into a recycle start-up agent stream and a recycle water stream. The priming step is continued until the temperature of the streams within the heater, supercritical upgrading reactor and cooling devices are maintained to within 5% of their set point for a period of at least 10 minutes. Then, the flow of the start-up agent containing primer stream to the upgrading reactor is stopped and then a heated and pressurized petroleum feedstock is supplied to the first mixing device, wherein the heated and pressurized petroleum feedstock is maintained at a temperature of between about 10 and 250° C. The heated and pressurized water stream and the heated and pressurized petroleum feedstock are mixed in the first mixing device to produce a mixed water and start-up petroleum feedstock stream and then the mixed water and start-up petroleum feedstock stream are supplied to the upgrading reactor, said reactor being maintained at a temperature that is between about 380 and 550° C. to produce an upgraded petroleum containing stream, wherein the mixed water and start-up petroleum feedstock stream has a residence time in the upgrading reactor of between about 10 seconds and 60 minutes. The upgraded petroleum containing stream is cooled to a temperature of less than about 150° C. and then depressurized. The cooled upgraded petroleum containing stream is separated into a gaseous phase upgraded and desulfurized petroleum containing stream and liquid phase upgraded and desulfurized petroleum containing stream, and the liquid phase upgraded and desulfurized petroleum containing stream is separated into an upgraded and desulfurized petroleum product stream and a recycle water stream.

In certain embodiments, the water and start-up agent are each separately heated to a pressure greater than the critical pressure of water, alternatively between about 23 MPa and 30 MPa, alternatively between about 24 MPa and 26 MPa. In certain embodiments the start-up agent is heated to a temperature of between about 10 and 250° C., alternatively between about 50 and 200° C., alternatively between about 100 and 175° C. In certain embodiments, the water can be heated to a temperature of between about 250 and 650° C., alternatively between about 300 and 550° C., alternatively between about 400 and 550° C.

In certain embodiments, the supercritical water reactor is maintained at a temperature of between about 380 and 550° C., alternatively between about 390 and 500° C., alternatively between about 400 and 450° C. Residence time of the reactants in the supercritical reactor is between 1 second and 2 hours, alternatively between about 10 seconds and 1 hour, alternatively between about 30 seconds and 30 minutes, alternatively between about 1 minute and 20 minutes, alternatively between about 5 minutes and 30 minutes, alternatively between about 30 seconds and 15 minutes, alternatively between about 30 seconds and 10 minutes.

In certain embodiments, the product stream from the supercritical reactor is cooled to a temperature of less than about 150° C., alternatively to a temperature between about 5 and 150° C., alternatively between about 10 and 100° C., alternatively between about 25 and 75° C.

DETAILED DESCRIPTION OF THE INVENTION

Figure 1:
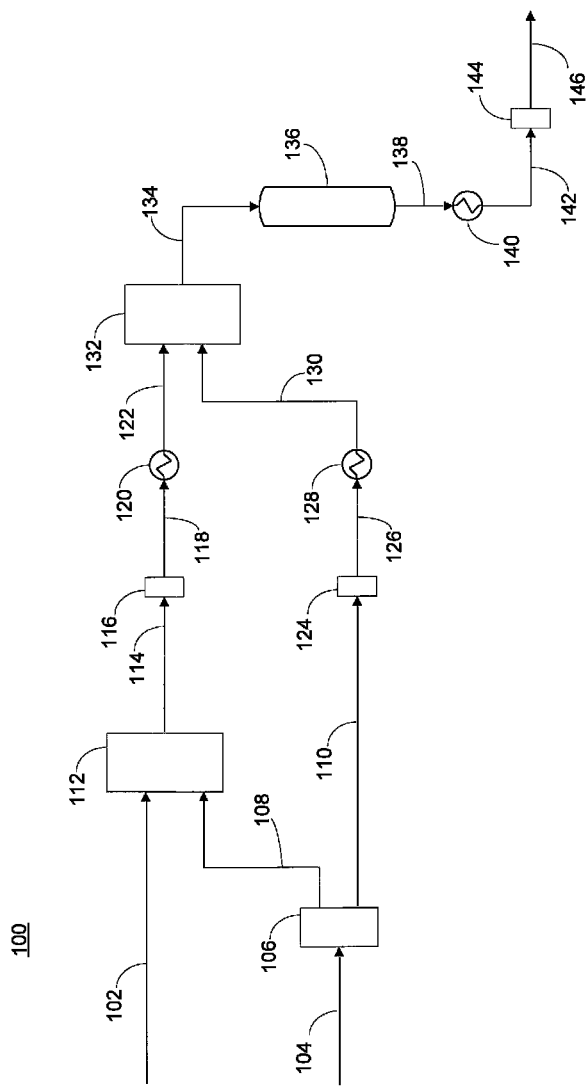
FIG. 1 is an embodiment of a prior art supercritical upgrading process.

Although the following detailed description contains many specific details for purposes of illustration, it is understood that one of ordinary skill in the art will appreciate that many examples, variations and alterations to the following details are within the scope and spirit of the invention. Accordingly, the exemplary embodiments of the invention described herein and provided in the appended figures are set forth without any loss of generality, and without imposing limitations, on the claimed invention.

Petroleum upgrading utilizing supercritical water is one of the most promising non-conventional approaches for the treatment and desulfurization of whole crude oil and various process streams from refineries. The plugging of the process line through the formation of coke, coke precursor, or sludge, however, is one of the most serious technical challenges for the operation and scaling-up of the process. Localized heating or the creation of "hot spots" facilitates inter-radical reactions, leading to the formation of coke precursors, coke and sludge. The use of supercritical water can suppress the inter-radical reactions that lead to the formation of these undesirable species. The methods described herein provide for a novel method for starting-up of the process that is effective to the prevention of the formation of materials that may plug up the system.

As used herein, "petroleum feedstock" refers to crude oil, crude oil refinery distillates, crude oil refinery residue, cracked products from a crude oil refinery, liquefied coal, bitumen, hydrocarbons that originates from biomass, and the like.

As used herein, "upgrading" and "desulfurization" refers that product of a process has higher API gravity, higher middle distillate yield, lower sulfur content, lower nitrogen content, lower metal content than those of petroleum feedstock that is supplied to the process.

As used herein, "supercritical water" is defined as water that is present at a temperature that is greater than about 374° C. and pressure that is greater than about 21.1 MPa.

The present methods provide for the operation of a process for the upgrading and desulfurization of petroleum feedstock to produce a petroleum product having increased API gravity, increased middle distillate yield, decreased sulfur content, decreased nitrogen content, and decreased metal content. The process is conducted in the absence of any externally supplied hydrogen, does not generate coke in the reactor, and does not result in the plugging of process lines.

More specifically, petroleum feedstock is supplied to a large upgrading reactor where it is contacted with supercritical water and at least a portion of the hydrocarbon molecules present are cracked and at least a portion of the impurities present in the feedstock, such as sulfur, nitrogen and metal-containing species, are removed. Advantageously, in certain embodiments, the treatment with supercritical water can be conducted in the absence of externally supplied hydrogen, in the absence of a catalyst, and/or without generating coke in the process line and without plugging of process lines.

More specifically, the method of starting-up of the supercritical water process described herein is designed to upgrade and desulfurize the petroleum feedstock and prevent generation of coke in the process line and plugging of process line, which can reduce the quality of petroleum product from the process and cause unexpected shut-downs.

This methods described herein utilize supercritical water, which can function as the reaction medium, catalyst, and source of hydrogen to upgrade petroleum. At supercritical conditions, the phase boundary between liquid and gas phases of water disappears. The resulting supercritical water has various unique properties, and is quite different from subcritical water. Supercritical water has very high solubility with respect to organic compounds and is infinitely miscibility with gases. Also, near-critical water (i.e., water that is at a temperature and pressure are very near to, but not exceed, the critical point of water) has very high dissociation constant. This means water at near-critical conditions is very acidic. This acidity can be utilized as a catalyst for the upgrading and desulfurization of petroleum feedstocks. Furthermore, radical species in the presence of supercritical water may be stabilized through cage effect (generally understood as what occurs when water molecule(s) surrounds radicals to prevent them interact). By stabilizing the radical species that are present, inter-radical condensation reactions are prevented, thereby reducing the amount of coke that is produced as a result of inter-radical condensation, such as is found with polyethylene. Supercritical water is also capable of generating hydrogen through steam reforming reaction and water-gas shift reactions, which can then be used for upgrading petroleum.

In spite of many advantages that are associated with the use of supercritical water process for the upgrading and desulfurization of petroleum feedstock, there are still challenges that remain to be solved. One challenge is reducing or eliminating the frequent plugging of process line by sludge or coke that is generated in the supercritical water reactor. The sludge or coke generation can be the result of limited hydrogen being present in the reactor as the reaction proceeds. Because many of the embodiments described herein have limited hydrogen availability, without the novel aspects of the present invention, there would be a greater chance to generate coke precursor, coke, and sludge. Coke precursor, coke, and sludge are all representative of certain hydrocarbon compounds having hydrogen to carbon ratio of less than 1:1, and generally have no or very little solubility in supercritical water.

It is well known that plugging of the process lines, particularly the lines leading to and including the heat exchanger(s) and pressure let-down device(s), can result in the unexpected increase of pressure drop through the process line, and eventually result in the required shut-down of entire process to remove the materials that are plugging the equipment. Additionally, because the coke precursor, coke, and sludge have very low economic value, any production thereof results in decreased process economy because of loss/conversion of valuable petroleum feedstock to low economic valued product.

Coke precursor, coke, and sludge can be generated through inter-molecular or inter-radical condensation of certain aromatic molecules to form polyaromatic compounds. The use of supercritical water can, in certain embodiments, reduce or prevent the formation of these compounds. Without wishing to be bound by any specific theory, it is believed that supercritical water may have a stabilizing effect (also known as "cage effect"), which can suppress inter-radical reactions, which generally occur at certain elevated temperatures, for example at temperatures greater than about 350° C., more specifically at a temperature greater than about 374° C. In certain embodiments, however, a portion of petroleum feedstock that may not be readily dissolved in supercritical water can undergo inter-radical reaction, which can lead to the generation of coke precursor, coke, and sludge through certain condensation and/or polymerization reactions. While supercritical water can dissolve most molecules found in crude oil, some molecules, particularly the heavy molecules, require additional time to dissolve. This can also occur when a portion of the petroleum feedstock that has been heated to elevated temperature, temperatures greater than about 350° C., outside of the presence of supercritical water or before contacting the supercritical water, experiences inter-radical reaction which eventually generates coke precursor, coke, and sludge.

In certain embodiments, during the initial stage of feeding the petroleum feedstock into the reactor, coking can occur due to unstable phase balance between supercritical water and petroleum feedstock, which is believed to be the result of a sudden increase of the concentration of petroleum feedstock in the reactor. In certain embodiments, the formation of coke precursor, coke, and sludge can be eliminated by ensuring a high dispersion of the petroleum feedstock in supercritical water. In certain embodiments, this may be one of the most important steps in this process. Mixing can be achieved by many different means, such as with a static mixer, an inline mixer, an impeller, or the like. In certain embodiments, the mixing can occur in a mixing zone that is located upstream of the reactor, or alternatively it can take place within the reactor.

It is believed that in certain embodiments, the effectiveness of mixing of the supercritical water and the petroleum feedstock during the initial feeding stage may be limited due to an unstable phase boundary of the mixture of supercritical water and petroleum feedstock. This may be due, in part, to a sudden increase of the concentration of the petroleum feedstock in the reactor.

Referring now to FIG. 1, a comparative example is shown. The figure illustrates the an exemplary method for the upgrading and desulfurization of a petroleum feedstock with supercritical water. Exemplary petroleum and hydrocarbon feedstocks can include, but are not limited to, whole range crude oil, topped crude oil, product stream from petroleum refinery processes, product streams from steam crackers, liquefied coal, liquid products recovered from oil sand, bitumen, asphaltene, and various hydrocarbons that originate from biomass. In certain embodiments, the petroleum or hydrocarbon feedstock can have an API gravity in the range of about 1 to 40, a hydrogen/carbon molar ratio in the range of about 0.5 to 2.1, and a sulfur content in the range of between about 0.1 to 7.5% by weight. In certain embodiments, the petroleum or hydrocarbon feedstock can be an Arabian heavy crude oil having an API Gravity of about 28, and a sulfur content of about 3.1 wt % sulfur; a vacuum residue from Arabian heavy crude oil having an API Gravity of about 3, a sulfur content of about 6.0% by weight, and a hydrogen to carbon ratio of about 1.4:1; an atmospheric residue from Arabian heavy crude oil having an API gravity of about 4.5, a sulfur content of about 4.5% by weight, and a hydrogen to carbon ratio of about 1.55:1; or an Athabasca bitumen having an API gravity of about 6, a sulfur content of about 5.5% by weight, and hydrogen to carbon ratio of about 1.5:1.

Apparatus 100 is an apparatus for the upgrading and desulfurization of a sulfur containing petroleum feedstock. Petroleum feedstock supplied via line 102 and water supplied via line 108 can be supplied to first mixing device 112 to produce combined petroleum and water stream 114. First mixing device 112 can be selected from a static mixer, an inline mixer, an impeller, or like device. Water is supplied to apparatus 100 via line 104, and is split into two water streams by splitter 106, which produces first water stream 108, which supplies water to mixer 112, and second water stream 110, which supplies a supercritical water stream to reactor 132. Combined petroleum and water stream 114 is supplied to pump 116 to produce pressurized combined petroleum and water stream 118.

Pressurized combined petroleum and water stream 118 can then be fed to first heating means 118, which is shown to be a heat exchanger, although it is understood that other known heating devices can similarly be used to heat the pressurized combined petroleum and water stream to provide a heated and pressurized combined petroleum and water stream. In certain embodiments, heated and pressurized combined petroleum and water stream 122 can be heated to a temperature of between about 30° C. and 300° C., alternatively to a temperature of between about 50° C. and 150° C.

Water supplied via line 110 can be pressurized by pump 124 to produce pressurized water stream 126. Pressurized water stream 126 can then be supplied to second heating means 128, which, while shown as a heat exchanger, can be any known heating means. Heating means 128 produces heated and pressurized water stream 130. Heated and pressurized water stream 130 can be heated to a temperature of between about 300° C. and 800° C., alternatively to a temperature of between about 400° C. and 650° C.

In certain embodiments, the temperature of heated and pressurized combined petroleum and water stream is maintained at a temperature of less than about 150° C. in an effort to prevent coke precursor, coke and sludge generation.

Heated and pressurized combined and water streams 122 and 130 are fed to second mixing device 132 to produce mixed stream 134. Second mixing device 132 can be a static mixer, an inline mixer, an impeller-embedded mixer, or other mixing device known in the art. After the heated and pressurized combined and water streams 122, 130 have been mixed to produce mixed stream 134, the mixed stream can be supplied to reactor 136.

Reactor 136 can be a tubular type reactor, a vessel type reactor equipped with a stirrer or other means for providing mixing or agitation, or like apparatus, and can be vertical, horizontal, or both vertical and horizontal. In certain embodiments, the reactor does not include baffles. Reactor 136 can be maintained at a temperature that is greater than the critical temperature of water (i.e., at a temperature that is greater than about 374° C.), alternatively between about 380° C. and 600° C., alternatively between about 390° C. and 450° C. Within the reactor, the petroleum feedstock is treated with supercritical water to upgrade and desulfurized the feedstock and product an upgraded hydrocarbon containing stream 138

Upgraded hydrocarbon containing stream 138 can be supplied from reactor 136 to cooling means 140, to reduce the temperature of the upgraded hydrocarbon containing stream. Cooling means 140 is shown as a heat exchanger, although it is understood that any means for reducing the temperature of stream 138, such as a chiller, can also be employed. In certain embodiments, cooling means 140 can be a heat exchanger having a double pipe, shell-and-tube type, or other configuration known in the art. The temperature of upgraded hydrocarbon containing stream 142 can be between about 10° C. and 200° C., alternatively between about 30° C. and 150° C. The pressure of stream 142 can be reduced by let-down device 144, which can be pressure regulator or other similar device known in the art. Upstream of let-down device 144, the pressure in upgraded hydrocarbon containing stream is maintained at between about 3200 psig and 6000 psig, alternatively between about 3300 psig and 4500 psig. Let-down device 144 can reduce the pressure of stream 142 from between about −30 psig and 30 psig. Suitable depressurizing devices can include a pressure regulating valve, capillary tube, or other device known in the art.

In certain embodiments, the product stream from reactor 136 can be heat exchanged with the start-up stream or water, wherein the start-up stream or water is heated and the product stream is cooled by the process.

The general start-up procedure for the apparatus shown in FIG. 1 is as follows. Water supplied via line 104 to splitter 106 fed to first mixing device 112, first pump 116 and first heater 120. A valve (not shown) in petroleum feed line 102 is closed such that only water is being supplied to first pump 116 and first heater 120. At the same time, water is supplied via line 110 to second pump 124 and second heater 128. The first and second heaters 120 and 128 and reactor 136 are heat to pre-determined levels. Cooling means 140 is then started to achieve and maintain the temperature at a certain pre-determined level. After certain amount of time after the starting of first and second pumps 116 and 124, the pressure of the system is increased to a pre-determined level by controlling let-down device 144.

After the temperature of first and second heaters 120 and 128 and reactor 136 reach a pre-determined temperature, a valve (not shown) positioned within line 108 is closed, and the valve positioned within line 102 is opened, thereby supplying the petroleum feed to first mixing device 112, first pump 116, first heater 120, and second mixing device 132. The flow rate of the petroleum feedstock to the apparatus can be controlled by controlling the opening and/or closing of the valves positioned within lines 102 and 108.

In general, it is inevitable that there will be a transition period where an unstable phase boundary between petroleum feedstock and water exists. In particular, the heavy fraction of petroleum feedstock, for example, an asphaltene fraction, can be segregated from the remainder of the petroleum feedstock present in the reactor, which can eventually lead to coking. In certain embodiments, during the transition period, a part of petroleum feedstock may experience localized heating (i.e., heating in the absence of supercritical water), which can lead to the generation of coke precursor, coke, and sludge. Coke, coke precursor, and sludge are all undesired as they can lead to a blockage of the lines, and shut-down of the process. In general, a small amount of coke, coke precursor, or sludge can lead to a blockage between the reactor and cooler, which will require that the process be shut-down due to the resulting pressure drop. Lines must be cleaned and/or replaced, leading to significant down time and economic loss.

Figure 2:
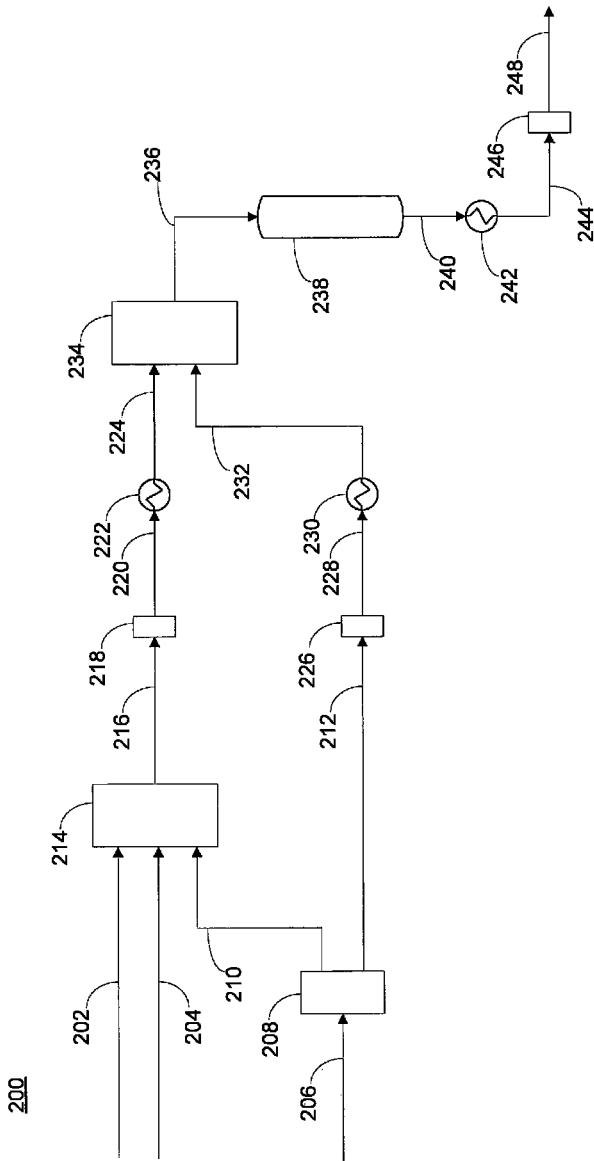
FIG. 2 is an embodiment of a supercritical upgrading process according to one embodiment described herein.

FIG. 2 shows an example of supercritical water process to upgrade and desulfurized petroleum feedstock according to one embodiment of the present invention.

Apparatus 200 is provided for the upgrading and desulfurization of a petroleum feedstock. A start-up agent and petroleum feedstock are provided to first mixing device 214 via lines 202 and 204, respectively. Water is supplied to splitter 208 via line 206, which splits the water into lines 210 and 212, which supply a first water stream and a second water stream, respectively. The first water stream supplied via line 210 to first mixing device 214. First mixing device 214 can be any suitable means for mixing fluid streams of varying viscosity, including but not limited to a static mixer, an inline mixer, an impeller-embedded mixer or other mixing device known in the art. Lines 202, 204, and 210 can each include various valves and pumps, as may be necessary to control the flow of fluids therethrough.

First mixing device 214 can combine the various feeds to supply line 216. Line 216 can include first pump 218 and first preheater 222, and is supplied to second mixing device 234. Line 212 can include second pump 226 and second preheater 230, and is supplied to second mixing device 234. Second mixing device 234 can be any suitable means for mixing fluid streams of varying viscosity, including but not limited to a static mixer, an inline mixer, an impeller-embedded mixer or other mixing device known in the art. Preheater 222 can be capable of heating fluids provided thereto up to a temperature of between about 30 and 300° C., alternatively between about 50 and 150° C. Preheater 230 is capable of heating a pressurized water stream provided thereto up to a temperature of between about 300 and 800° C., alternatively between about 400 and 650° C. In certain embodiments, petroleum feedstock supplied to first preheater 222 is not heated to a temperature that is greater than about 150° C., to prevent or reduce the generation of coke precursor, coke, and sludge.

Second mixing device 234 can produce a mixed stream that exits the mixer via line 236, and is supplied to reactor 238. Reactor 238 can have a vertical, horizontal, or combined orientation. Reactor 238 can be a tubular type reactor, a vessel type reactor, or like apparatus, and can be equipped with means for providing mixing, include a stirrer or other known means. The temperature within reactor 238 is maintained at a temperature that is greater than the critical temperature of water (i.e., at a temperature that is greater than about 374° C.). In certain embodiments, the reactor temperature is maintained in the range of about 380 to 600° C., alternatively at a temperature of between about 390 to 475° C., alternatively at a temperature of between about 400 to 460° C. In certain embodiments, the temperature is between about 400 to 450° C. Residence time of the reactants in reactor 238 can be between 1 second and 120 minutes, alternatively between 5 seconds and 60 minutes, alternatively between about 10 seconds and 30 minutes, alternatively between about 30 seconds and 30 minutes, alternatively between 30 seconds and 20 minutes, alternatively between about 30 seconds and 10 minutes. In certain embodiments, the residence time is between about 1 and 30 minutes, alternatively between about 2 and 20 minutes. In certain embodiments, the residence time will not exceed 15 minutes, such that the residence time is between about 2 and 15 minutes. The product stream exits reactor 238 via line 240, and can be supplied to heat exchanger or cooler 242, designed to reduce the temperature of the fluids carried via line 240, and pressure let down device 246, designed to reduce the pressure of the fluids exiting the reactor. Cooler 242 can be a chiller or heat exchange of double pipe or shell-and-tube type, or other form as known in the art. Cooler 242 reduces the temperature of the product stream carried in line 240 such that the product stream in line 244 is at a temperature of between about 10 and 200° C., alternatively between about 30 and 150° C., alternatively between about 10 and 100° C., alternatively between about 25 and 70° C. Pressure let down device 246 reduces the pressure in stream 244 such that the pressure of the fluids in stream 248 is reduced from between about 3200 psig and 6000 psig, alternatively between about 3300 psig and 4500 psig, to within the range of between about −30 psig and 30 psig, alternatively between about −10 psig and 10 psig. Pressure of streams before Let-Down Device is maintained in the range of about 3,200 psig to 6,000 psig, more preferably, about 3,300 psig to 4,500 psig. The pressure let-down device can be a pressure regulating valve, capillary tube, or other device as is known in the art.

The start-up procedure for apparatus 200, as provided in FIG. 2, is as follows. The procedure begins as a valve in line 210 is closed and water is supplied via line 206 to splitter 208, which supplied water via line 212 to second pump 226. At the same time, a valve within line 204 is closed to prevent supply of the petroleum feedstock to first mixing device 214. A start-up agent, such as toluene, is fed line 202 to first mixing device 214, which supplies the start-up agent via line 216 to first pump 218. First and second preheaters 222 and 230 are heated to pre-determined levels, as provided previously. Cooler 242 is operated at a pre-determined level. The start-up agent can be selected based upon high miscibility with supercritical water, and be readily available in a conventional refining process.

After certain time from starting pumps, or alternatively after the preheaters have been heated to a pre-determined levels, pumps 218 and 226 and let down device 246 are operated such that pre-determined pressures are achieved within the system. After a predetermined amount of time has allowed apparatus 200 to reach pre-determined temperatures and pressures, a valve within line 202 is closed, thereby stopping the flow of the start-up agent to the first mixing device 214, and a valve within line 204 is opened, thereby allowing the petroleum feedstock to be supplied to the first mixing device. According to this procedure, the petroleum feedstock can be supplied to the system (and ultimately to reactor 238) in a step-wise fashion. Alternatively, the flow of the petroleum feedstock to mixing device 214 and line 216 exiting therefrom can be gradually increased while maintaining a constant pressure of fluids within line 216 by controlling the opening of the valve positioned within line 204, and the closing of the valve positioned within line 202.

During the transition period as the flow of the start-up agent to the system is decreased and stopped, and the flow of the petroleum feedstock is started and gradually increased, the petroleum feedstock is well mixed with supercritical water because the step of supplying the start-up agent to the system provides a very stable fluid and pressure in lines 216, 220 and 224 located between first mixing device 214 and second mixing device 234. Use of the start-up agent allows for continuous operation of the process, as the start-up agent prevents and/or reduces plugging of the process equipment that typically results from the formation of sludge, coke, and coke precursors. In general, once a process line becomes plugged, pressure within the line drops, thereby accelerating the formation of sludge, coke or coke precursors, and accelerating the plugging of the equipment.

In certain embodiments, the start-up agent can create favorable fluid conditions within the system for the step of supplying and processing certain petroleum feedstocks. By creating the favorable fluid conditions with the use of the start-up agent prior to the step of supplying petroleum feedstock, mixing of the petroleum feedstock and supercritical water in second mixing device 234 is improved. The start-up agent increases the ability for the supercritical water to solubilize the petroleum feedstock, particularly heavy hydrocarbons. This leads to a dramatic and unexpected reduction in the production of coke, coke precursors, and sludge within reactor 238, which occur when the start-up agent is not employed. The production of coke, coke precursors, and sludge is particularly common when the petroleum feedstock includes heavy hydrocarbons, such as asphaltenes.

Exemplary start-up agents can be selected from the pure hydrocarbons or a mixture of hydrocarbons, generally having a boiling point that ranges from about 30° C. and about 250° C., alternatively between about 30° C. and about 90° C., alternatively between about 90° C. and about 150° C., alternatively between about 150° C. and about 250° C. The start-up agent can have an aromatic compound content of between about 30 and 100% by volume, alternatively between about 30 and 50% by volume, alternatively between about 50 and 75% by volume, alternatively between about 75 and 95% by volume, alternatively at least about 95% by volume. Generally, the start-up agent can have a solid matter content of less than 10% by weight, alternatively less than about 5% by weight, alternatively less than about 2% by weight, alternatively less than about 1% by weight. Alternatively, the start-up agent can have a solid content of less than about 25 ppm by weight, alternatively less than about 15 ppm by weight, alternatively less than about 10 ppm by weight, alternatively less than about 5 ppm by weight.

In certain embodiments, the start-up agent can be selected from aromatic hydrocarbons, such as benzene, toluene, o-xylene, m-xylene, p-xylene, ethylbenzene, and combinations thereof. In certain embodiments, the start-up agent can be a product from a refining process, such as reformate from catalytic reformer, light cracked naphtha from an FCC, visbreaker naphtha, coker naphtha, and the like. In certain embodiments, the start-up agent can a product selected from a petrochemical process, such as the product of the pyrolysis of gasoline from steam cracker.

In general, the selected start-up agent (for example, toluene) can be readily mixed with supercritical water (for example, the water supplied to mixer 234 via line 232, as shown in FIG. 2), in part because it has low CST (i.e., critical solution temperature). At temperatures greater than the CST of the start-up agent, the start-up agent is typically fully mixed with solvent (in this case, water). The CST of toluene has been reported to be about 308° C. at about 220 atm. Thus, at supercritical conditions, the mixture of water and toluene is well mixed and has very high solvent power toward hydrocarbons. The high solvent power of the mixture of water and the start-up agent is believed to facilitate immediate mixing of the petroleum feedstock into supercritical water provided via line 232.

In certain embodiments, with the apparatus shown in FIG. 1, the rapid and sudden injection of a petroleum feedstock, regardless of the rate of injection of said petroleum feedstock, causes a localized agglomeration of a portion of the petroleum feedstock in mixer 234, reactor 238 and line 236 connecting the mixer and the reactor. Such localized agglomeration spots are the result of poor mixing, and can lead to the conversion of hydrocarbon feedstock into coke precursor, coke, and sludge. Once the coke precursor, coke, and sludge has been formed, the process lines of the equipment are vulnerable to plugging, which can then induce a pressure drop throughout the process lines of the apparatus, resulting in the unexpected but necessary shut-down of the process.

One major advantage of upgrading a hydrocarbon or petroleum feedstock using the apparatus provided in FIG. 2 is that the apparatus provides a more intimate mixing of the petroleum feedstock and the supercritical water. The start-up agent and water provide a fully mixed fluid having high solvent power toward the hydrocarbon or petroleum feedstock that can be formed in line 236, positioned between second mixing device 234 and reactor 238, before petroleum feedstock is injected into the system. Thus, the front wave of the petroleum feedstock that is injected into the system contacts a fully mixed fluid that includes supercritical water and the start-up agent, and can be readily mixed into the fluid, due in part to the high solvent power of the fluid. Even after the flow of the start-up agent is stopped and the flow of the petroleum or hydrocarbon feedstock to the apparatus is started, the fluids within line 236 are fully mixed and do not include portions of petroleum or hydrocarbon that aggregate together, as is the case with the apparatus of FIG. 1. Even after the supply of the start-up agent to the apparatus has been stopped, use of the apparatus of FIG. 2 provides for the formation of a stable, homogeneous mixture (i.e., the apparatus provides a homogenous mixture of the petroleum feedstock and supercritical water), and also provides light hydrocarbons which can be generated through the upgrading reaction by contacting the petroleum feedstock with supercritical water in second mixing device 234. The light hydrocarbons generated by the step of contacting the supercritical water and petroleum feedstock can have properties that are similar to the properties of the start-up agent, and facilitate the mixing of incoming petroleum or hydrocarbon feedstock into supercritical water.

EXAMPLES

In the following examples, pilot-scale reactor systems having the components shown in FIGS. 3 and 5 were utilized, respectively. The petroleum feedstock that was utilized was Arabian heavy crude oil having a total sulfur content of about 3.1 wt %, a total metal content of about 63 ppm (by weight), an API gravity (at about 60° F.) of 26, and resid having boiling point of over 483° C.+=34 vol %).

Example 1

Figure 3:
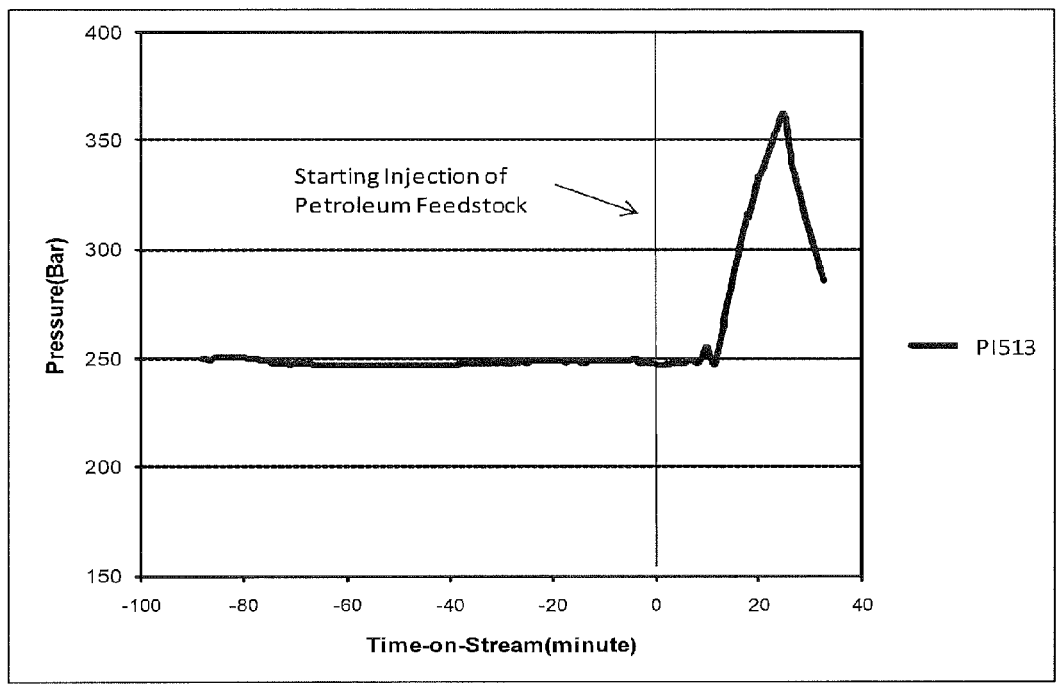
FIG. 3 is a graph showing pressure in the line immediately upstream of the supercritical reactor in the embodiment shown in FIG. 3.

Referring now to FIG. 3, a deionized water tank (upstream from water line 104, not shown) and a crude oil tank (upstream from crude oil line 102, not shown) were filled with deionized water and Arabian heavy crude oil, respectively. Valve 103 positioned in line 102 and valve 105 in line 104 were each opened. Two high pressure pumps were connected to the deionized water tank T1, a were set at a volumetric flow rate of about 1.5 L/hr STP, and water was fed into the process lines 108 and 110. Pre-heaters positioned in lines 102 and 108 were set to temperatures of 538° C. and 150° C., respectively. Reactor 136 consisted of two vessel-type reactors connected in series. First vessel-type reactor had an impeller-type agitator inside to facilitate mixing of feed stream, wherein the rotating speed of the impeller was approximately 600 rpm. Both the first and second vessel-type reactors were maintained at a temperature of about 380° C. and the temperature therein was monitored with multiple thermocouples positioned within each reactor. Temperatures of reactor internal fluids were controlled with the thermocouples placed in the most downstream position of the reactor. The product stream from reactor 136 was cooled with double pipe-type heat exchanger 140 to reduce the temperature of the stream to less than 100° C. The pressure within the line was released by back pressure regulator 144. Operating pressure of the reactor was maintained at about 250 Bar.

After allowing the temperature within each piece of equipment to stabilize at predesignated levels, valve 103 was opened and valve 105 was simultaneously closed to change feed to line 114 from deionized water from the water holding tank to the Arabian heavy crude oil from the crude oil tank. FIG. 3 shows a measure of the pressure measured by a pressure sensor located just upstream from the inlet of reactor 136, which shows a relatively sudden and rapid increase in the pressure within the line due to plugging as a result of the formation of coke, coke precursor, and sludge. After the pressure measured by the pressure sensor reached a pre-designated safety limit (set here at 360 Bar), the whole reactor system shut-down by a safety interlock. The total operation time, once the flow of the petroleum feedstock was initiated, was less than 25 minutes.

Example 2

Referring now to FIG. 2, start-up agent feed tank (upstream from start-up line 202, not shown) was integrated to a pump through valve 203. A storage tanks filled with deionized water was fluidly connected to line 206 and another storage tanks filled with Arabian heavy crude oil was fluidly connected to line 204. The properties of the start-up agent are provided in Table 1. Pumps were connected to water storage tank and start-up agent storage tank by manipulating one or more valves. After setting the pumps at a volumetric flow rate of 1.0 l/hr at STP, water and the start-up agent were fed to the process line 216. Pre-heaters 222 and 230 were set at temperatures of about 150° C. and 550° C., respectively. Reactor 238 consisted of two vessel type reactors connected in series, wherein the first reactor had impeller-type agitator operated at 600 rpm to facilitate mixing of feed stream. The temperatures of two reactors connected in series were set to 390° C. and monitored using multiple thermocouples per reactor. The temperature of reactor fluids were controlled using a thermocouple positioned at the most downstream position of the reactor. The product stream from the second reactor was cooled by double-pipe type heat exchanger 242 to a temperature of less than 100° C. Pressure was released by back pressure regulator 246. During operation, a pressure of about 250 Bar was maintained.

Figure 4:
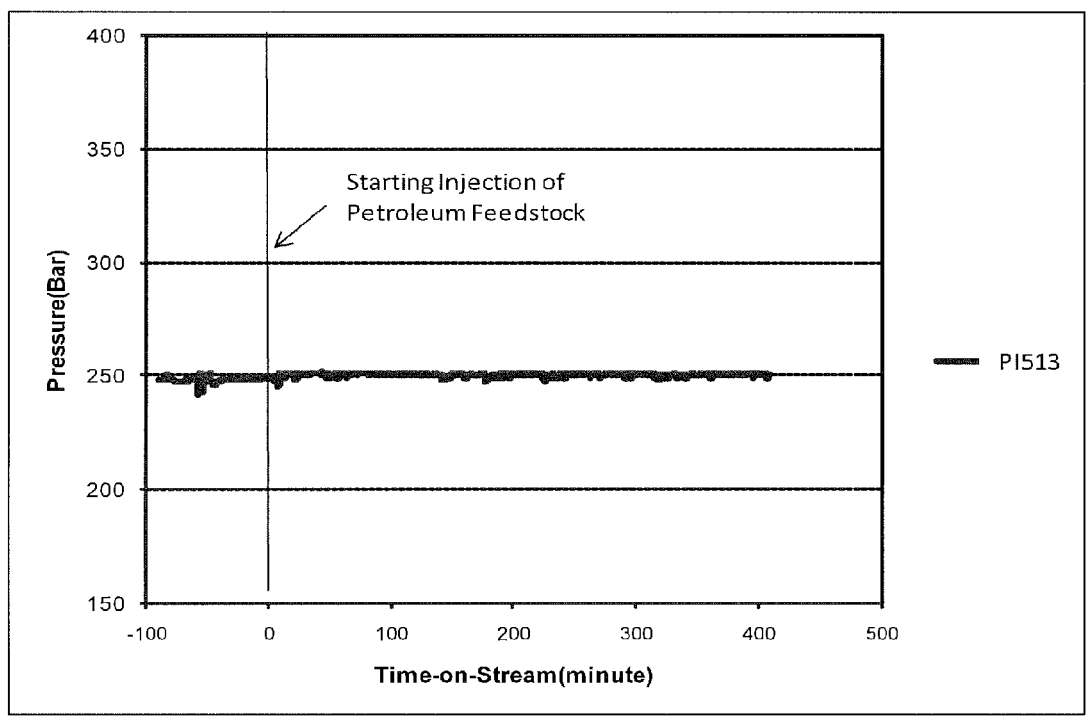
FIG. 4 is a graph showing pressure in the line immediately upstream of the supercritical reactor of an embodiment.

After the temperature within each piece of equipment was stabilized at predesignated levels, the feed to the pump was changed from the start up agent via line 202 to Arabian heavy crude oil supplied via line 204 as valve 203 was closed and valve 205 was opened. As shown in the FIG. 4, pressure measured at a position located just upstream of reactor 238 remained constant at the pre-designated value of 250 Bar. In this example, the apparatus operated for a total operation time of 400 minutes without experiencing any plugging of the process lines. The total sulfur content of product was 31% lower than that of Arabian Heavy Crude Oil feedstock, and total metal content (i.e., the sum of nickel and vanadium contents) decreased to 85% of original content. API gravity of the product increased by 5 as a result of the supercritical water mediated upgrading.

TABLE 1

Start-up agent Properties.

Start-up agent Composition (vol. %)

| Paraffins | Isoparaffins | Olefins | Naphthenes | Aromatics | Unknown |
|---|---|---|---|---|---|
| 12.7 | 31.4 | 1 | 1.2 | 53.3 | 0.4 |

Distillation (ASTM D-86) (volume %, °C.)

| IBP | 10% | 20% | 30% | 40% | 50% | 60% | 70% | 80% | 90% | 95% | EP |
|---|---|---|---|---|---|---|---|---|---|---|---|
| 38 | 74 | 88 | 97 | 105 | 113 | 122 | 131 | 140 | 151 | 161 | 183 |

It is understood that the various figures provided herein to assist in the understanding of the various embodiments of the invention may not show all of the valves and pumps necessary for the operation thereof. One of skill in the art would understand that various pumps and valves can be placed within one or more process line to facilitate the operation thereof.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these references contradict the statements made herein.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose, nor are not part of the name or description of the component, nor do they necessarily define a relative location or position of the component. Furthermore, it is to be understood that that the mere use of the term "first" and "second" does not require that there be any "third" component, although that possibility is contemplated under the scope of the present invention.

That which is claimed is:

1. A method for upgrading a petroleum feedstock with supercritical water while preventing plugging in equipment process lines, the method comprising the steps of:

priming an upgrading reactor to receive the petroleum feedstock, the priming of the apparatus comprising the steps of:
supplying a heated and pressured water stream to a first mixing device, wherein the water stream is heated and pressurized to a temperature and pressure greater than the critical point of water;
supplying a heated and pressurized start-up hydrocarbon stream to the first mixing device, wherein the start-up hydrocarbon stream is heated and pressurized to a temperature of between about 10 and 250° C.;
mixing the heated and pressurized water stream and the heated and pressurized start-up hydrocarbon stream in the first mixing device to produce a water and start-up hydrocarbon containing primer stream;
supplying the water and start-up hydrocarbon containing primer stream to the upgrading reactor, said reactor being maintained at a temperature that is between about 380 and 550° C. to produce a treated primer stream, wherein the primer stream has a residence time in the upgrading reactor of between about 10 seconds and 60 minutes;
cooling the treated primer stream to a temperature of less than about 150° C., depressurizing the cooled treated primer stream;
separating the cooled treated primer stream into treated primer gas and treated primer liquid phase streams;
separating the treated primer liquid phase into a recycle start-up hydrocarbon stream and a recycle water stream;
continuing the priming step until the temperature of the streams within a heater, supercritical upgrading reactor and cooling devices are maintained to within 5% of their set point for a period of at least 10 minutes;
stopping the flow of the start-up hydrocarbon containing primer stream to the upgrading reactor and then supplying a heated and pressurized petroleum feedstock to the first mixing device, wherein the heated and pressurized petroleum feedstock is maintained at a temperature of between about 10 and 250° C.;
mixing the heated and pressurized water stream and the heated and pressurized petroleum feedstock in the first mixing device to produce a mixed water and start-up petroleum feedstock stream;

supplying the mixed water and start-up petroleum feedstock stream to the upgrading reactor, said reactor being maintained at a temperature that is between about 380 and 550° C. to produce an upgraded petroleum containing stream, wherein the mixed water and start-up petroleum feedstock stream has a residence time in the upgrading reactor of between about 10 seconds and 60 minutes;

cooling the upgraded petroleum containing stream to a temperature of less than about 150° C., depressurizing the cooled upgraded petroleum containing stream;

separating the cooled upgraded petroleum containing stream into a gaseous phase upgraded and desulfurized petroleum containing stream and liquid phase upgraded and desulfurized petroleum containing stream;

separating the liquid phase upgraded and desulfurized petroleum containing stream into an upgraded and desulfurized petroleum product stream and a recycle water stream.

2. The method of claim 1, wherein the start-up hydrocarbon is selected from benzene, toluene, xylene, and ethylbenzene.

3. The method of claim 1, wherein the start-up hydrocarbon is selected from reformate from a catalytic reformer, light cracked naphtha from an FCC unit, visbreaker naphtha, coker naphtha, and pyrolysis gasoline from a steam cracker.

4. The method of claim 1, wherein the start-up hydrocarbon has an aromatic content of at least about 30% by volume.

5. The method of claim 1, wherein the start-up hydrocarbon has a solid content of less than about 10 ppm.

6. The method of claim 1, wherein the petroleum feedstock is selected from the group consisting of whole range crude oil, topped crude oil, the product stream from a petroleum refinery, the product stream from a steam cracker, liquefied coal, the liquid product recovered from oil sand, bitumen, asphaltene, and hydrocarbons that originate from biomass.

7. The method of claim 1, wherein the water, start-up hydrocarbon and petroleum feedstock streams are each pressurized to a pressure that is greater than the critical pressure of water.

8. The method of claim 1, wherein the volumetric flow rate of the start-up agent and water is between 1:5 and 1:1.

9. The method of claim 1, wherein the water is heated to a temperature of between about 300 and 550° C.

10. The method of claim 1, wherein the reactor is maintained at a temperature of between about 400 and 450° C.

11. The method of claim 1, the mixed water and start-up petroleum feedstock stream has a residence time in the upgrading reactor of between about 20 and 30 minutes.

12. The method of claim 1, wherein the step of cooling the upgraded petroleum containing stream exiting the upgrading reactor comprises supplying the stream to a heat exchanger wherein the stream is heat exchanged with a start-up hydrocarbon or water stream.

13. The method of claim 1, wherein the upgraded petroleum containing stream is cooled to a temperature of between about 25 and 75° C.

14. The method of claim 1, wherein the pressure of upgraded petroleum containing stream exiting the upgrading reactor is reduced to between about 0.1 and 0.5 MPa.

15. The method of claim 1, further comprising recycling the recycle start-up hydrocarbon stream to the first mixing device.

16. The method of claim 1, further comprising recycling the recycle water stream to the first mixing device.

* * * * *